US012644491B2

(12) United States Patent
Nozka et al.

(10) Patent No.: US 12,644,491 B2
(45) Date of Patent: Jun. 2, 2026

(54) CONNECTION SYSTEM FOR COMPONENTS HAVING ROTATABLE SHAFTS

(71) Applicant: HONEYWELL INTERNATIONAL INC., Charlotte, NC (US)

(72) Inventors: Michal Nozka, Brno (CZ); Tibor Merka, Brno (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 393 days.

(21) Appl. No.: 18/505,273

(22) Filed: Nov. 9, 2023

(65) Prior Publication Data

US 2025/0154989 A1 May 15, 2025

(51) Int. Cl.
| | |
|---|---|
| *F16D 1/08* | (2006.01) |
| *F16D 3/80* | (2006.01) |
| *F16D 25/04* | (2006.01) |

(52) U.S. Cl.
CPC ............. *F16D 1/0805* (2013.01); *F16D 3/80* (2013.01); *F16D 25/046* (2013.01)

(58) Field of Classification Search
CPC ........ F16D 1/0805; F16D 1/0835; F16D 3/80; F16D 3/82; F16D 25/046
See application file for complete search history.

(56) References Cited

U.S. PATENT DOCUMENTS

| | | | | |
|---|---|---|---|---|
| 3,516,681 | A | * | 6/1970 | Cox ...................... B23B 31/305 |
| | | | | 279/4.03 |
| 4,264,229 | A | * | 4/1981 | Falk ........................ F16L 37/06 |
| | | | | 192/85.13 |
| 5,195,838 | A | * | 3/1993 | Katz ................... B41F 13/0008 |
| | | | | 74/401 |
| 10,794,436 | B2 | | 10/2020 | Smith |
| 11,293,498 | B2 | | 4/2022 | Flower |
| 2004/0055850 | A1 | | 3/2004 | Howard |
| 2021/0340915 | A1 | | 11/2021 | Nixon |

FOREIGN PATENT DOCUMENTS

| | | |
|---|---|---|
| CN | 109282027 A | 1/2019 |
| WO | 2021/181105 A1 | 9/2021 |

* cited by examiner

*Primary Examiner* — Richard M Lorence
(74) *Attorney, Agent, or Firm* — Ingrassia Fisher & Lorenz LLP

(57) ABSTRACT

A connection system for components includes a first component having a first shaft, and a second component having a second shaft. The connection system includes a sleeve coupled to the second shaft that includes a chamber to be disposed about a portion of the first shaft, and a valve fluidly coupled to the chamber. The connection system includes a piston defining an inner piston bore. The piston is coupled to the second shaft and movable relative to the second shaft. The connection system includes a valve actuation member received within the inner piston bore and movable relative to the piston. The piston is to move relative to the second shaft to couple the sleeve to the first shaft in a first state and the valve actuation member is to move relative to the piston to uncouple the sleeve from the first shaft in a second state.

20 Claims, 7 Drawing Sheets

CONNECTION SYSTEM FOR COMPONENTS HAVING ROTATABLE SHAFTS

TECHNICAL FIELD

The present disclosure generally relates to the coupling of components, and more particularly relates to a connection system for coupling and uncoupling two rotatable shafts, such as rotatable shafts associated with components of a vehicle.

BACKGROUND

In certain instances, it may be desirable to couple together two rotatable shafts. For example, in certain aerial vehicles, such as aircraft, a rotatable shaft of a starter generator is coupled to a rotatable shaft of a main engine gearbox to transmit torque to the main engine gearbox to assist in starting the main engine of the aircraft or to transmit torque from the engine gearbox to the starter generator to generate electric power. It may be desirable to uncouple the rotatable shaft of the starter generator and the rotatable shaft of the main engine gearbox during certain operating conditions. In certain instances, the rotatable shaft of the starter generator or the rotatable shaft of the main engine gearbox includes a shear section, which is configured to uncouple the starter generator from the main engine gearbox through a permanent disconnection. The permanent disconnection between the starter generator and the main engine gearbox requires replacement of the shaft(s) upon disconnection, which results in downtime for the aerial vehicle.

Accordingly, it is desirable to provide a connection system that enables the coupling and uncoupling of two rotatable shafts without a permanent disconnection. Furthermore, other desirable features and characteristics of the present disclosure will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

According to various embodiments, provided is a connection system for components. The connection system includes a first component having a first rotatable shaft, and a second component having a second rotatable shaft. The connection system includes a sleeve coupled to the second rotatable shaft. The sleeve includes a hydraulic chamber configured to be disposed about a portion of the first rotatable shaft, and a valve fluidly coupled to the hydraulic chamber. The valve is configured to control a flow of a hydraulic fluid relative to the hydraulic chamber. The connection system includes a piston defining an inner piston bore that extends from a first piston end to a second piston end. The piston is coupled to the second rotatable shaft and movable relative to the second rotatable shaft. The connection system includes a valve actuation member received within the inner piston bore and movable relative to the piston. The piston is configured to move relative to the second rotatable shaft to couple the sleeve to the first rotatable shaft in a first state and the valve actuation member is configured to move relative to the piston to uncouple the sleeve from the first rotatable shaft in a second state.

The connection system includes a solenoid and a pawl coupled to the valve actuation member in the first state of the connection system, and in the second state of the connection system, the solenoid is configured to release the pawl to move the valve actuation member to open the valve to uncouple the sleeve from the first rotatable shaft. The piston includes a pair of notches, and the valve actuation member includes a detent system configured to couple the valve actuation member to the pair of notches in the second state. The connection system includes a fluid reservoir defined in the second rotatable shaft that includes the hydraulic fluid, and the fluid reservoir is fluidly coupled to the valve and to the sleeve. The second rotatable shaft includes a first pressure chamber defined in the second rotatable shaft, and the first pressure chamber is fluidly coupled to the valve and to the fluid reservoir. The piston is coupled to the first pressure chamber, and the first pressure chamber includes a plurality of threads configured to engage with a plurality of piston threads of the piston. The valve is a check valve disposed in a valve chamber defined in the second rotatable shaft and fluidly coupled between the first pressure chamber and the sleeve. The sleeve is configured to receive the hydraulic fluid in the hydraulic chamber and to elastically deform to couple the first rotatable shaft to the second rotatable shaft in the first state. The valve chamber is fluidly coupled to the sleeve via a fluid conduit defined in the second rotatable shaft. The valve actuation member includes a first actuation end opposite a second actuation end, and a terminal end of the first actuation end is configured to engage the valve to open the valve. The second actuation end defines a contact surface.

Further provided is a connection system for components. The connection system includes a first component having a first rotatable shaft, and a second component having a second rotatable shaft. The second rotatable shaft defines a first pressure chamber and a valve chamber configured to receive a hydraulic fluid. The connection system includes a sleeve coupled to the second rotatable shaft. The sleeve includes an outer perimeter wall, an inner perimeter wall and defines a hydraulic chamber between the outer perimeter wall and the inner perimeter wall. The sleeve is configured to be disposed about a portion of the first rotatable shaft and the hydraulic chamber is fluidly coupled to the valve chamber. The connection system includes a valve fluidly coupled to the valve chamber, and the valve is configured to control a flow of the hydraulic fluid relative to the hydraulic chamber. The connection system includes a piston defining an inner piston bore that extends from a first piston end to a second piston end. The piston is coupled to the first pressure chamber and movable relative to the first pressure chamber. The connection system includes a valve actuation member received within the inner piston bore and movable relative to the piston. The piston is configured to move relative to the first pressure chamber to open the valve and to fill the hydraulic chamber to couple the sleeve to the first rotatable shaft in a first state and the valve actuation member is configured to move relative to the piston to drain the hydraulic chamber to uncouple the sleeve from the first rotatable shaft in a second state.

The connection system includes a solenoid and a pawl coupled to the valve actuation member in the first state of the connection system, and in the second state of the connection system, the solenoid is configured to release the pawl to move the valve actuation member to actuate the valve to uncouple the sleeve from the first rotatable shaft. The piston includes a pair of notches, and the valve actuation member includes a detent system configured to couple the valve actuation member to the pair of notches in the second state. The connection system includes a fluid reservoir defined in the second rotatable shaft that includes the hydraulic fluid, and the fluid reservoir is fluidly coupled to the valve and to the sleeve. The first pressure chamber is fluidly coupled between the valve and the fluid reservoir, and the first pressure chamber includes a plurality of threads configured to engage with a plurality of piston threads of the piston. The valve is a check valve, and the sleeve is configured to receive the hydraulic fluid in the hydraulic chamber and to elastically deform to couple the first rotatable shaft to the second rotatable shaft in the first state. The valve chamber is fluidly coupled to the sleeve via a fluid conduit defined in the second rotatable shaft. The valve actuation member includes a first actuation end opposite a second actuation end, and a terminal end of the first actuation end is configured to engage the valve to open the valve. The second actuation end defines a contact surface.

BRIEF DESCRIPTION OF DRAWINGS

The present disclosure will hereinafter be described in conjunction with the following drawing figures, wherein like numerals denote like elements, and wherein.

DETAILED DESCRIPTION

Figure 1:
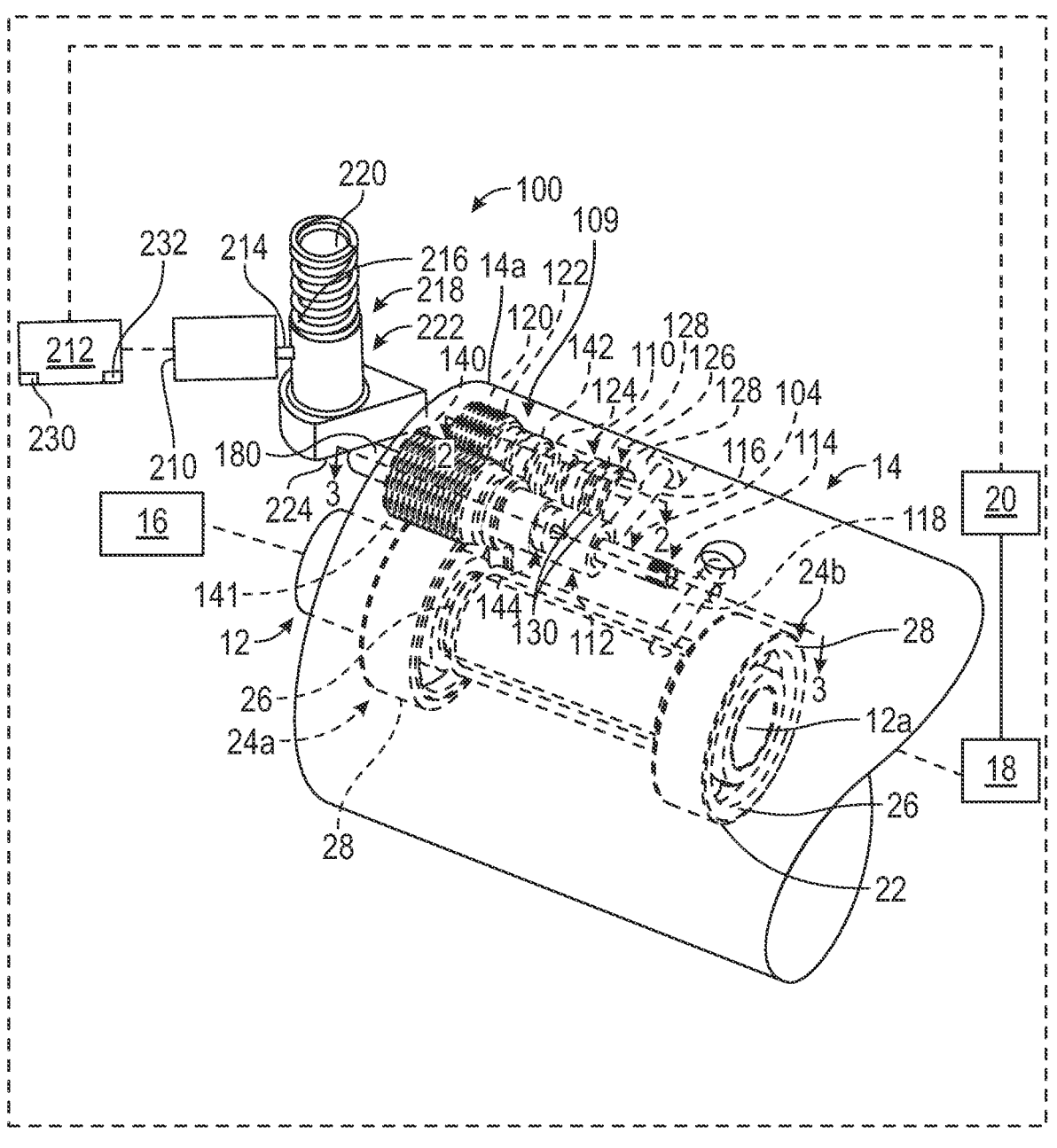
FIG. 1 is a schematic perspective view of a connection system for a first rotatable shaft and a second rotatable shaft associated with a vehicle, such as an aerial vehicle, in a first, connect state in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of device that would benefit from a connection system to couple and uncouple rotatable shafts described herein for use with a vehicle, such as an aerial vehicle, is merely one exemplary embodiment according to the present disclosure. In addition, while the connection system is described herein as being used with a vehicle, such as an aircraft, rotorcraft, unmanned aerial vehicle and the like, the various teachings of the present disclosure can be used with a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, machine learning models, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "about" denotes within 10% to account for manufacturing tolerances. In addition, the term "substantially" denotes within 10% to account for manufacturing tolerances.

With reference to FIG. 1, a schematic illustration of an exemplary connection system 100 for use with a vehicle 10, such as an aerial vehicle, is shown. The vehicle 10 includes, but is not limited to, an aircraft, a rotorcraft, unmanned aerial vehicle, etc. In this example, the vehicle 10 includes a first rotatable shaft or first shaft 12 and a second rotatable shaft or second shaft 14. In one example, the first shaft 12 is an output shaft of a starter generator 16 associated with the vehicle 10, and the second shaft 14 is an input shaft associated with an engine gearbox 18. Generally, the first shaft 12 is coupled to or uncoupled from the second shaft 14 by the connection system 100. When the connection system 100 is in a first, connect state, the first shaft 12 is driven or rotated by the starter generator 16 to drive the second shaft 14. The second shaft 14, in turn, drives other shafts associated with the engine gearbox 18 to assist in a starting of an engine 20 associated with the vehicle 10. In the example of the engine 20 as a gas turbine engine, the rotation of the second shaft 14 may drive a towershaft associated with the engine gearbox 18, which in turn, may drive a high-pressure shaft to turn a high-pressure compressor and a high pressure turbine associated with the engine 20 to allow the engine 20 to start. It should be noted that while the connection system 100 is described herein as being used to couple and uncouple two shafts, the connection system 100 may also be used to couple a shaft to a hub, a shaft to a flange, etc.

In the example of FIG. 1, a first end 12a of the first shaft 12 and a second end 14a of the second shaft 14 is shown. In this example, the first shaft 12 and the second shaft 14 are concentric, with the first shaft 12 received within a counterbore 22 defined along a central axis of the second shaft 14. The first shaft 12 and the second shaft 14 may each be composed of metal or metal alloy, and may be cast, forged, additively manufactured, etc. A pair of bearings 24a, 24b, such as ball bearings, may be received within or coupled to the counterbore 22. An inner race 26 of each of the bearings 24a, 24b is coupled to or about the first end 12a of the first shaft 12 and an outer race 28 of each of the bearings 24a, 24b is coupled to the second shaft 14. The bearings 24a, 24b facilitate the rotation and alignment of the first shaft 12 and the second shaft 14.

The connection system 100 couples or uncouples the first shaft 12 from the second shaft 14 in a non-permanent manner. Generally, the connection system 100 couples and uncouples the first shaft 12 from the second shaft 14 without damaging the first shaft 12 and/or the second shaft 14. In addition, as will be discussed, the connection system 100 is resettable such that an operator, such as a pilot, may uncouple the first shaft 12 from the second shaft 14 via input to a human-machine interface, for example, during flight and the connection system 100 may be reset by an operator, such as a ground crew member, on the ground.

Figure 2:
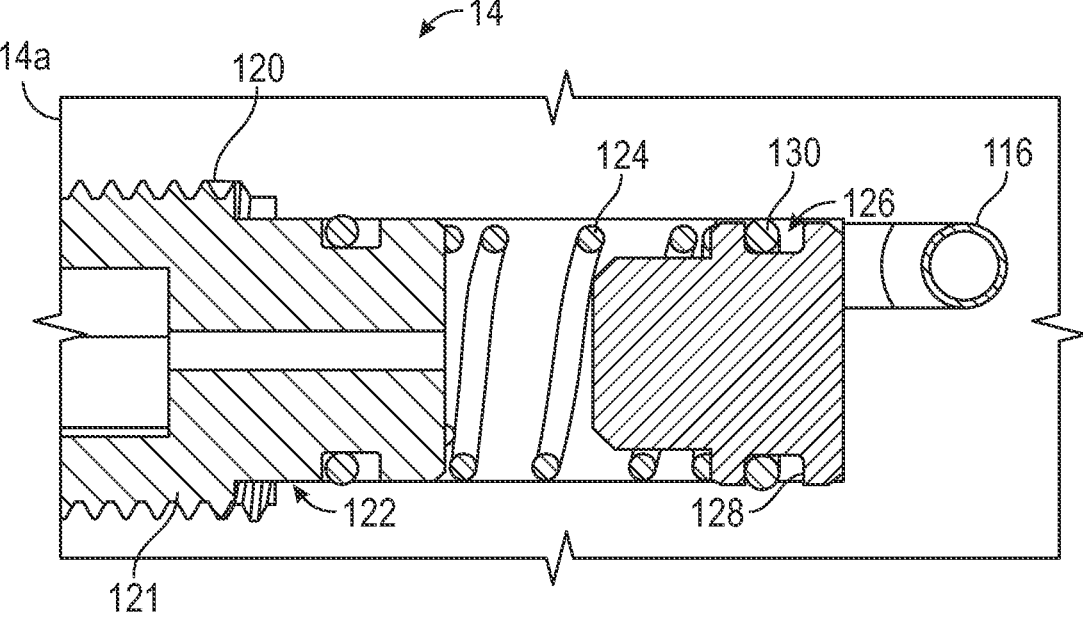
FIG. 2 is a cross-sectional view of a fluid reservoir of the connection system, taken along line 2-2 of FIG. 1.

In one example, the connection system 100 includes a fluid system 102, a valve 104, a sleeve 106 and a control system 108. In one example, the fluid system 102 is defined within the second shaft 14. In this example, the fluid system 102 includes a fluid reservoir 110, a first pressure chamber 112, a valve chamber 114, a first fluid conduit 116 and a second fluid conduit 118. The fluid reservoir 110 is defined upstream from the first pressure chamber 112. The fluid reservoir 110 defines a volume for storing a fluid, such as a hydraulic fluid, for use by the fluid system 102. In this example, with reference to FIG. 3, the fluid reservoir 110 is a counterbore defined in the second end 14a of the second shaft 14. With reference to FIG. 2, the fluid reservoir 110 defines a plurality of threads 120 at the second end 14a of the second shaft 14 that extend axially inward. The plurality of threads 120 matingly engage with a plurality of threads 121 defined on a first end of a hydraulic fitting 122. The hydraulic fitting 122 is removably coupled to the plurality of threads 120 to enclose the fluid reservoir 110 from an environment external to the second shaft 14. A second end of the hydraulic fitting 122 defines a seat for a biasing member or spring 124 and serves as a stop for a valve member or plunger 126. In one example, the spring 124 is a coil spring, and has a first end coupled to the seat of the hydraulic fitting 122 and a second end coupled to the plunger 126. The plunger 126 includes a seat at a first end, which is coupled to the spring 124. A second end of the plunger 126 includes at least one groove 128. The groove 128 is sized to receive an elastomeric sealing member 130, such as an O-ring. The spring 124 and the plunger 126 cooperate to draw a vacuum in the fluid system 102, which assists in damping during the disconnection of the first shaft 12 from the second shaft 14.

With reference back to FIG. 1, the first pressure chamber 112 is downstream from the fluid reservoir 110. The first pressure chamber 112 is fluidly coupled to or in fluid communication with the fluid reservoir 110 via the first fluid conduit 116. The first pressure chamber 112 includes a first pressure end 112a opposite a second pressure end 112b. The first pressure end 112a is in fluid communication with the valve chamber 114, and the first fluid conduit 116 is fluidly coupled to the first pressure chamber 112 proximate the first pressure end 112a. The second pressure end 112b is defined at the second end 14a of the second shaft 14. The first pressure chamber 112 includes a plurality of pressure threads 140, a piston 142 and a valve actuation member 144. The first pressure chamber 112 defines a volume for storing a fluid, such as a hydraulic fluid, for use by the fluid system 102. In this example, the first pressure chamber 112 is a counterbore defined in the second end 14a of the second shaft 14. The first pressure chamber 112 is spaced circumferentially apart from the fluid reservoir 110. In this example, the first pressure chamber 112 has a diameter at the second pressure end 112b that is different and greater than a diameter of the first pressure chamber 112 at the first pressure end 112a. Generally, the enlarged diameter of the first pressure chamber 112 extends axially from the second pressure end 112b toward a midsection 112c of the first pressure chamber 112. The plurality of pressure threads 140 are defined from the second pressure end 112b to extend axially inward toward the midsection 112c. The plurality of pressure threads 140 matingly engage with a plurality of piston threads 141 of the piston 142 to movably couple the piston 142 to the first pressure chamber 112. The midsection 112c is spaced apart from the second pressure end 112b and defines a groove, which receives a sealing member, such as an O-ring. The sealing member defines a seal between the piston 142 and the first pressure chamber 112.

Figure 3:
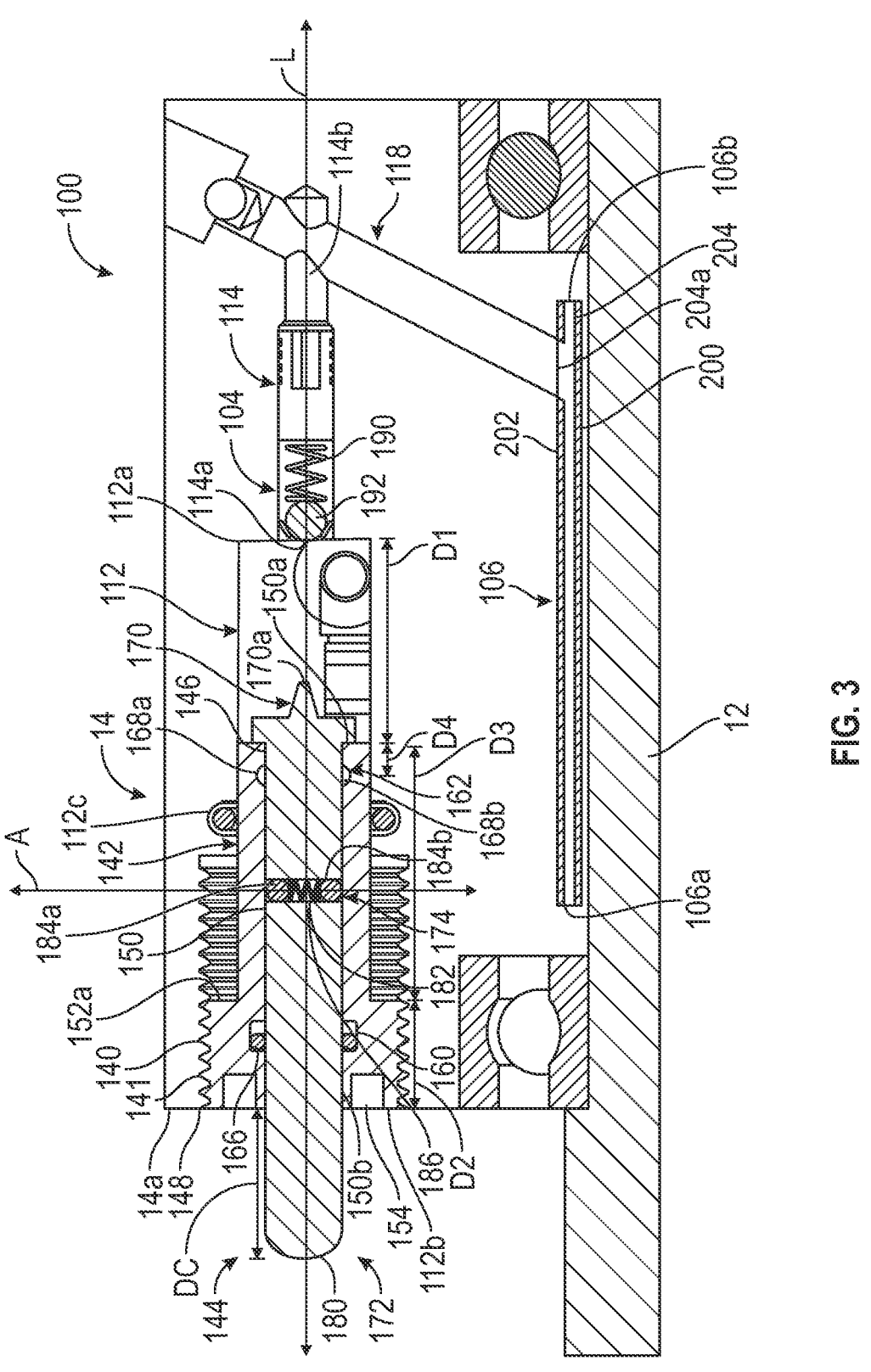
FIG. 3 is a cross-sectional view of a portion of the connection system, taken along line 3-3 of FIG. 1, in which the connection system is in the first, connect state.

As will be discussed, the piston 142 is movable relative to the first pressure chamber 112 between a first position, in which a second piston end 148 of the piston 142 is near or at the second pressure end 112b as shown in FIG. 3, and a second position, in which a surface 152a of a flange 152 is proximate or at the midsection 112*c*. The axial movement of the piston 142 pressurizes and depressurizes the first pressure chamber 112. Generally, as the piston 142 advances toward the valve chamber 114, the plunger 126 moves in the opposite direction, towards the hydraulic fitting 122 as the pressure increases in the first pressure chamber 112. As the piston 142 retracts or moves toward the second end 14*a*, the plunger 126 moves toward the first fluid conduit 116 or an end of the fluid reservoir 110, as shown in FIG. 2. The piston 142 may also be removed to enable the fluid, such as hydraulic fluid, to be introduced into the fluid system 102.

With reference to FIG. 3, the piston 142 is substantially cylindrical, and includes a first piston end 146 opposite a second piston end 148, with a piston bore 150 defined between the first piston end 146 and the second piston end 148. The piston 142 may be composed of metal or metal alloy, and may be cast, forged, additively manufactured, etc. The first piston end 146 is proximate but spaced apart from the first pressure end 112*a* of the first pressure chamber 112. In one example, the first piston end 146 is spaced a first distance D1 from the first pressure end 112*a* of the first pressure chamber 112, and the first distance D1 is about 10 millimeters (mm) to about 16 millimeters (mm). By sizing the first pressure chamber 112 such that the first piston end 146 is apart from the first pressure end 112*a* of the first pressure chamber 112, a fluid chamber is defined between the piston 142 and the first pressure end 112*a* of the first pressure chamber 112.

Figure 1A:
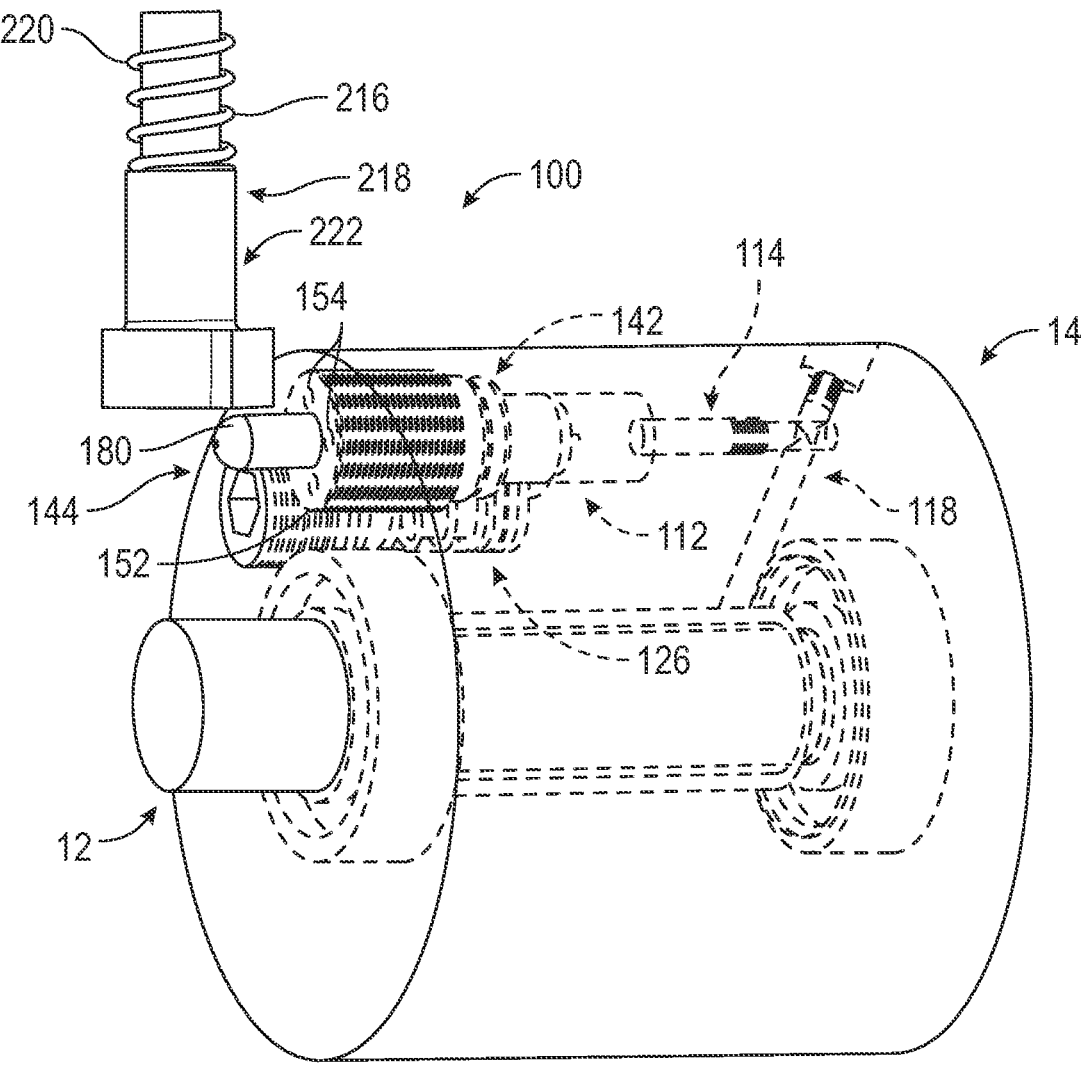
FIG. 1A is a side view of the connection system, the first rotatable shaft and the second rotatable shaft of FIG. 1.

The second piston end 148 includes a flange 152. The flange 152 is substantially cylindrical, and in one example, has a diameter that is different and greater than a diameter of the first piston end 146. The plurality of threads 141 are defined about an exterior circumference of the flange 152, and threadably couple the piston 142 to the first pressure chamber 112. With reference to FIG. 1A, the flange 152 includes a plurality of slots 154 that are spaced apart about the piston bore 150. Each of the slots 154 receive a tool to move or rotate the piston 142 within and relative to the first pressure chamber 112. The piston bore 150 receives the valve actuation member 144. The flange 152 extends axially from the second piston end 148 toward the first piston end 146. With reference back to FIG. 3, the flange 152 defines the surface 152*a*, which is proximate to or at the midsection 112*c* of the first pressure chamber 112 in the second position. Generally, the flange 152 extends from the second piston end 148 for a second distance D2, which is different and less than a third distance D3 a remainder of the piston 142 extends from the flange 152 to the first piston end 146. In one example, the second distance D2 is about 10 millimeters (mm) and the third distance D3 is about 22 millimeters (mm).

The piston bore 150 extends from the first piston end 146 through a portion of the flange 152. The piston bore 150 has a first bore end 150*a* opposite a second bore end 150*b*. The piston bore 150 includes a first seal groove 160 and a first detent 162. The first seal groove 160 is defined within the piston bore 150 to extend about a circumference of the piston bore 150. The first seal groove 160 is defined proximate the second bore end 150*b*. The first seal groove 160 is sized to receive a sealing member 166, such as an O-ring. The first detent 162 is a pair of notches 168*a*, 168*b* defined in the circumference of the piston bore 150. Generally, the notches 168*a*, 168*b* are defined opposite each other in the circumference of the piston bore 150 and are each sized to receive a respective detent ball 184*a*, 184*b* associated with the valve actuation member 144. In this example, the first detent 162 is defined proximate the first piston end 146 so as to be spaced a fourth distance D4 axially from the first piston end 146. In one example, the fourth distance D4 is about 3 millimeters (mm). It should be noted that in other examples, the first detent 162 may comprise a groove defined in the circumference of the piston bore 150 that receives the detent balls 184*a*, 184*b*.

The valve actuation member 144 is received within the piston bore 150 and is movable relative to the piston 142. The valve actuation member 144 may be composed of metal or metal alloy, and may be cast, forged, additively manufactured, etc. Generally, the valve actuation member 144 is coaxial with the piston bore 150. In this example, the valve actuation member 144 includes a first actuation end 170 opposite a second actuation end 172 and a retention system 174. The first actuation end 170 is frustoconical, and tapers to engage with the valve chamber 114. Generally, a terminal end 170*a* of the first actuation end 170 is tapered or pointed to be at least partially received within the valve chamber 114 as will be discussed.

The second actuation end 172 defines a contact surface 180 for the control system 108. In one example, the second actuation end 172 includes or defines a spherical contact surface, which ensures contact between the control system 108 and the valve actuation member 144. In this example, the contact surface 180 extends from a terminal end of the second actuation end 172 axially inward for a contact distance DC. The contact distance DC is about 10 millimeters (mm) to about 16 millimeters (mm). By providing the spherical contact surface 180, the second actuation end 172 does not need to be positioned in a specific orientation relative to the control system 108.

The retention system 174 is defined between the first actuation end 170 and the second actuation end 172. In this example, the retention system 174 is defined proximate the first actuation end 170. The retention system 174 includes a cross-bore 182, at least one or a pair of detent balls 184*a*, 184*b* and a biasing member or spring 186. The cross-bore 182 is defined along an axis A, which is substantially perpendicular to a longitudinal axis L of the valve actuation member 144. The longitudinal axis L is substantially parallel to an axis of rotation of the second shaft 14. The cross-bore 182 receives the spring 186 and the pair of detent balls 184*a*, 184*b*. The pair of detent balls 184*a*, 184*b* are substantially spherical, and are shaped to engage a respective one of the notches 168*a*, 168*b*. The spring 186 is disposed between the detent balls 184*a*, 184*b*, and is a coil spring. The spring 186 is compressed when the valve actuation member 144 is positioned within the piston 142 and not contained within the detent 168. When the cross-bore 182 is aligned with the detent 168, the spring 186 expands and forces the detent balls 184*a*, 184*b* into the respective one of the notches 168*a*, 168*b*. The detent balls 184*a*, 184*b* cooperate with the spring 186 and the notches 168*a*, 168*b* to hold the valve actuation member 144 relative to the piston 142 in a first state. In a second state of the valve actuation member 144, the detent balls 184*a*, 184*b* are uncoupled from the notches 168*a*, 168*b* such that the valve actuation member 144 is movable within the piston bore 150 and relative to the piston 142.

The valve chamber 114 is in selective fluid communication with or is fluidly coupled to the first pressure chamber 112 based on a position of the valve 104. In this example, the valve chamber 114 extends along an axis, which is substantially parallel to the longitudinal axis L of the valve actuation member 144. The valve chamber 114 is sized to receive the valve 104, and as will be discussed, the valve 104 places the valve chamber 114 in selective fluid communication with the first pressure chamber 112. The valve chamber 114 includes a valve inlet 114*a* in selective fluid communication with the first pressure chamber 112, and an opposite valve outlet 114*b* in fluid communication with or fluidly coupled to the second fluid conduit 118.

In one example, with reference back to FIG. 1, the first fluid conduit 116 is cylindrical and fluidly couples the fluid reservoir 110 with the first pressure chamber 112. It should be noted that the first fluid conduit 116 may have any desired shape and be defined at any desired orientation or location to fluidly couple or enable fluid communication between the fluid reservoir 110 and the first pressure chamber 112.

With reference back to FIG. 3, the second fluid conduit 118 is in fluid communication with or is fluidly coupled to the sleeve 106. In one example, the second fluid conduit 118 is also in fluid communication with or is fluidly coupled to the valve chamber 114 such that the second fluid conduit 118 fluidly couples the valve chamber 114 to the sleeve 106. In one example, the second fluid conduit 118 extends along an axis, which is substantially oblique to the longitudinal axis L and the axis of rotation of the second shaft 14. It should be noted, however, that the second fluid conduit 118 may be defined at any desired orientation to fluidly connect the valve chamber 114 with the sleeve 106. The second fluid conduit 118 is cylindrical, but it should be noted that the second fluid conduit 118 may have any desired shape.

The valve 104 is disposed within the valve chamber 114. In one example, the valve 104 is a one-way ball check valve, which includes a valve biasing member or valve spring 190 and a valve ball 192. The valve spring 190 is a coil spring, which applies a spring force to the valve ball 192 to bias the valve ball 192 against the valve inlet 114*a* of the valve chamber 114. Thus, generally, the valve ball 192 is biased against the valve inlet 114*a* to inhibit the flow of the fluid into or out of the valve chamber 114. The valve ball 192 is any suitable ball that forms a seal against the valve inlet 114*a* to inhibit fluid flow between the valve chamber 114 and the first pressure chamber 112. As will be discussed, the terminal end 170*a* of the valve actuation member 144 is operable to move or displace the valve ball 192 from the valve inlet 114*a* to enable the fluid to flow out of the valve chamber 114 into the first pressure chamber 112 or to open the valve 104.

The sleeve 106 is composed of metal or metal alloy, and is cast, welded, additively manufactured, etc. For example, the sleeve 106 may be integrally formed with the second shaft 14 via additive manufacturing, or may be a discrete or separate from the second shaft 14 and coupled to the second shaft 14 via welding. The sleeve 106 is cylindrical, and is sized and shaped to be disposed about a circumference or perimeter of the first shaft 12. The sleeve 106 includes an inner perimeter or inner circumferential wall 200 and an outer perimeter or outer circumferential wall 202 that is opposite the inner circumferential wall 200. In this example, the sleeve 106 defines a hydraulic chamber or second pressure chamber 204 between the inner circumferential wall 200 and the outer circumferential wall 202. The second pressure chamber 204 is in fluid communication with or is fluidly coupled to the second fluid conduit 118 via a chamber inlet 204*a*. The chamber inlet 204*a* is defined proximate a second sleeve end 106*b*, which is opposite a first sleeve end 106*a*. The chamber inlet 204*a* is defined through the outer circumferential wall 202 to direct the fluid into the second pressure chamber 204. As will be discussed, the inner circumferential wall 200 is elastically deformable upon receipt of the fluid to contact the first shaft 12 and clamp the first shaft 12 to the second shaft 14.

The control system 108 is responsive to input to disconnect the first shaft 12 from the second shaft 14. In one example, the control system 108 includes a solenoid 210 and a controller 212. The solenoid 210 may be in communication with the controller 212, over a suitable communication architecture that enables the transfer of data, power, commands, such as a bus, to receive one or more control signals to disconnect the first shaft 12 from the second shaft 14. In one example, the solenoid 210 is an electrically actuated solenoid, and includes a pin 214, a pawl biasing member or pawl spring 216 and a pawl 218. The pin 214 is movably coupled to the pawl 218. Generally, the pin 214 retains the pawl 218 in the first, connect state of the connection system 100 such that the pawl 218 is spaced apart from, uncoupled from or not in contact with the valve actuation member 144. The solenoid 210 is responsive to the one or more control signals from the controller 212 to retract the pin 214, thereby releasing the pawl 218 in a second, disconnect state of the connection system 100. The pawl spring 216 is a coiled compression spring, which is coupled about a stem 220 of the pawl 218 and biases the pawl 218 toward the second, disconnect state. In the first, connect state, the pawl spring 216 is compressed. Upon retraction of the pin 214, the pawl spring 216 applies a spring force to the pawl 218 to move the pawl 218 into contact with the contact surface 180 of the valve actuation member 144. In one example, the pin 214 is orientated such that a pin axis or axis along which the pin 214 extends is substantially parallel to the axis of rotation of the second shaft 14.

The pawl 218 includes the stem 220 and a contact body 222. The stem 220 is substantially cylindrical and defines a seat for the pawl spring 216. The contact body 222 is substantially wedge or pie shaped, and defines a ramp surface 224. The ramp surface 224 is shaped and sized to contact the contact surface 180 of the second actuation end 172 of the valve actuation member 144 in the second, disconnect state. It should be noted that while the solenoid 210 is described and illustrated herein as actuating the pawl 218 to contact the valve actuation member 144, in other embodiments, a linear actuator may be used to actuate the pawl 218 or the valve actuation member 144 to move the valve actuation member 144.

The controller 212 is responsive to input received from the human-machine interface associated with the vehicle 10, for example, to output the one or more control signals to the solenoid 210 to move the connection system 100 to the second, disconnect state. The controller 212 is in communication with the human-machine interface, which may be a keyboard, touchscreen display, etc., over a suitable communication architecture, that enables the transfer of power and data, such as a bus. The controller 212 includes at least one processor 230 and a computer-readable storage device or media 232. The processor 230 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 212, a semiconductor-based microprocessor (in the form of a microchip or chip set), any combination thereof, or generally any device for executing instructions. The computer readable storage device or media 232 may include volatile and nonvolatile storage in read-only memory (ROM), random-access memory (RAM), and keep-alive memory (KAM), for example. KAM is a persistent or non-volatile memory that may be used to store various operating variables while the processor 230 is powered down. The computer-readable storage device or media 232 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 212 in controlling the vehicle 10. In various embodiments, the controller 212 is configured to output the one or more control signals to the solenoid 210 to retract the pin 214 and release the pawl 218 to move the connection system 100 from the first, connect state to the second, disconnect state based on input received from the human-machine interface. For example, an operator, such as a pilot, may provide input to a touchscreen display associated with the human-machine interface to move the connection system 100 to the second, disconnect state. Based on the input received to the human-machine interface, the controller 212 may output the one or more control signals to the solenoid 210.

In other examples, the control system 108 may be configured differently. For example, a sensor in communication with the controller 212, via a suitable communication architecture that enables the transfer of data, power, commands, such as a bus, may observe a portion of the connection system 100 and generate sensor signals based thereon. Upon receipt of the sensor signals, the controller 212 may output the one or more control signals to the solenoid 210 to retract the pin 214. As an example, a temperature sensor may be associated with the connection system 100 and in communication with the controller 212. The temperature sensor may observe at least one of the bearings 24a, 24b, and generate sensor signals based on the observation. Upon receipt of the signals from the temperature sensor, the controller 212 may compare the temperature observed to a predetermined threshold stored in a datastore, and determine, based on the comparison, to output the one or more control signals to the solenoid 210 to retract the pin 214. For example, the controller 212 may output the one or more control signals when the temperature observed is greater than the threshold.

In one example, in order to assemble the connection system 100, with the fluid reservoir 110, the first pressure chamber 112, the valve chamber 114, the first fluid conduit 116 and the second fluid conduit 118 defined in the second shaft 14, the sleeve 106 is coupled to the second shaft 14 to be in fluid communication with the second fluid conduit 118. The valve 104 is coupled to the valve chamber 114. In one example, the valve 104 may be coupled to the valve chamber 114 before the second fluid conduit 118 is defined in the second shaft 14. The plunger 126 is coupled to the fluid reservoir 110 with the spring 124. The valve actuation member 144, with the detent system 176, is inserted into the piston 142, and the piston 142 is coupled to the first pressure chamber 112 via the threads 140, 141 in the first position. The fluid reservoir 110 is filled with the fluid, and the hydraulic fitting 122 is coupled to the fluid reservoir 110.

Figure 4:
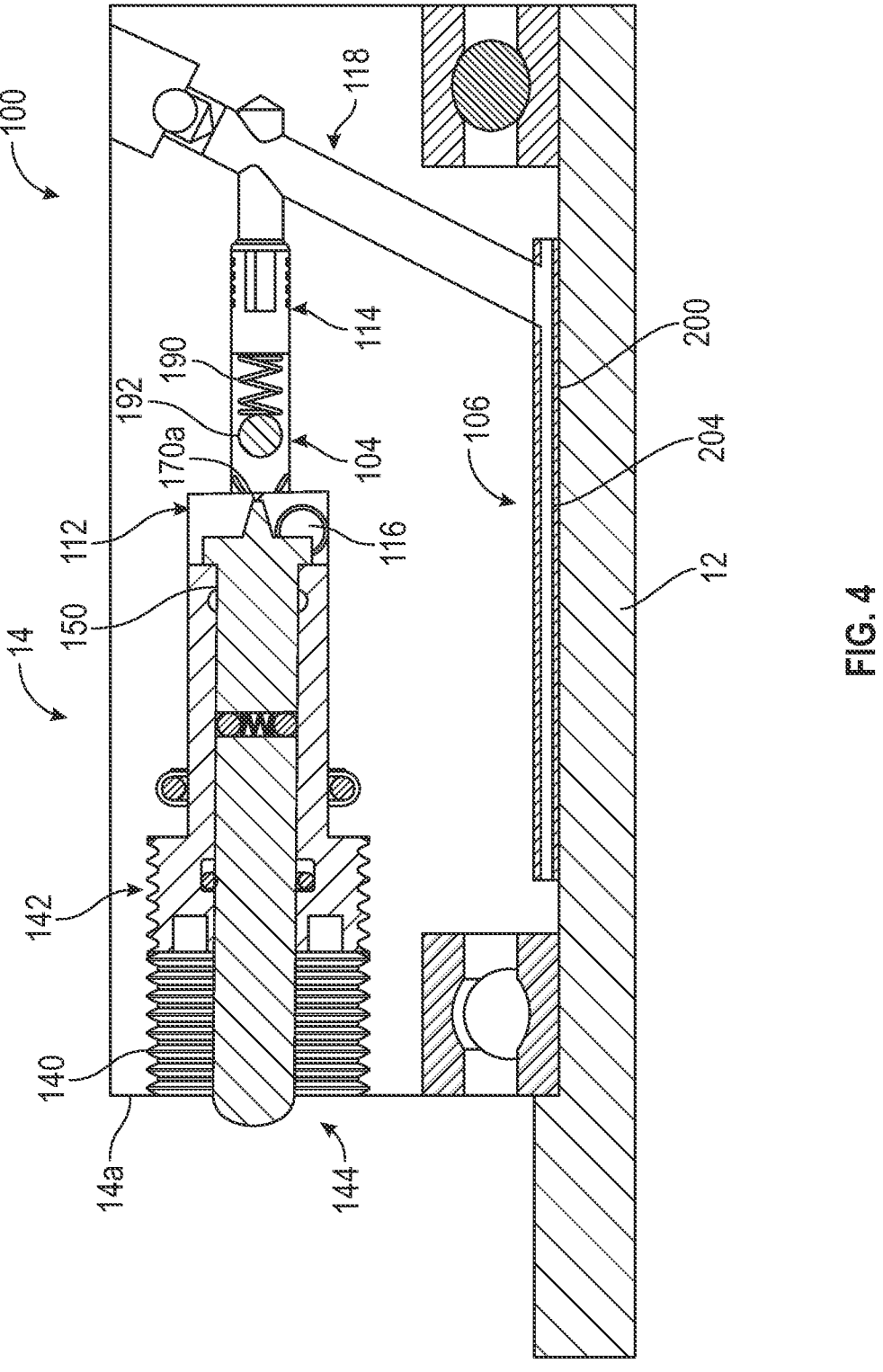
FIG. 4 is a cross-sectional view of the portion of the connection system, taken from the perspective of line 3-3 of FIG. 1, in which the connection system is in a third, coupling state.

In one example, in order to couple the first shaft 12 to the second shaft 14, the connection system 100 is placed in the first, connect state. In order to move the connection system 100 to the first, connect state, with the detent balls 184a, 184b of the valve actuation member 144 uncoupled from the notches 168a, 168b, the piston 142 is rotated or threaded within the first pressure chamber 112 to move the piston 142 from the first position to the second position. As the piston 142 moves from the first position toward the second position, the first pressure chamber 112 is pressurized, which causes the fluid to flow from the first pressure chamber 112 into the empty fluid reservoir 110 and causes the plunger 126 to move toward the hydraulic fitting 122 and compress the spring 124. When the plunger 126 contacts the hydraulic fitting 122, the first pressure chamber 112 is pressurized. The piston 142 is further advanced in the first pressure chamber 112, by the threading of the piston 142, to move the piston 142 toward the second position. The further advancement of the piston 142 increases the pressure in the first pressure chamber 112, and the pressure of the fluid moves the valve ball 192 axially, overcoming the force of the valve spring 190 to open the valve inlet 114a. With reference to FIG. 4, the connection system 100 is in a third, coupling state. In the third, coupling state, the valve inlet 114a is opened and the fluid flows from the first pressure chamber 112 through the valve 104 into the valve chamber 114. From the valve chamber 114, the fluid flows through the second fluid conduit 118 to the sleeve chamber 206. The continued flow of the pressurized fluid through the valve inlet 114a to the sleeve chamber 206 causes the inner circumferential wall 200 of the sleeve 106 to elastically deform and apply a clamping force to the first shaft 12. The clamping force applied by the elastic deformation of the sleeve 106 couples or connects the first shaft 12 to the second shaft 14, thereby enabling torque transfer between the first shaft 12 and the second shaft 14. In one example, the sleeve 106 deforms about 0.1 millimeters (mm) to about 0.3 millimeters (mm).

Figure 5:
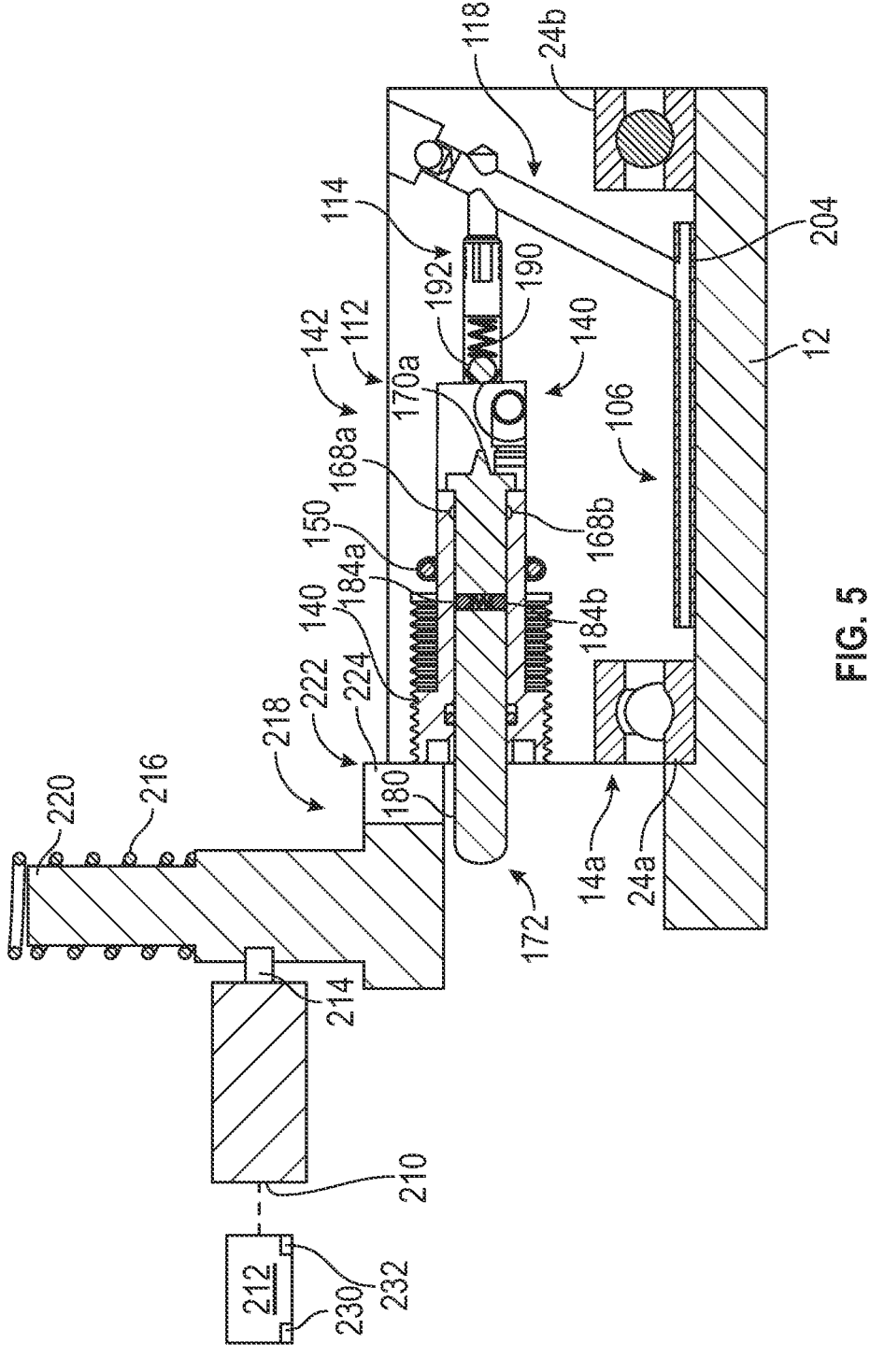
FIG. 5 is a cross-sectional view of the portion of the connection system, taken from the perspective of line 3-3 of FIG. 1, in which the connection system is in a fourth, standby state.

Once the sleeve 106 is clamped to the first shaft 12 to couple the first shaft 12 to the second shaft 14, with reference to FIG. 5, the connection system 100 is set to a fourth, standby state. In order to place the connection system 100 in the fourth, standby state, the piston 142 is moved from the second position to the first position. The movement of the piston 142 from the second position to the first position reduces the pressure in the first pressure chamber 112, and causes the plunger 126 to move away from the hydraulic fitting 122 as the hydraulic fluid flows from the fluid reservoir 110 to the first pressure chamber 112. As the piston 142 moves back to the first position, the pressure in the first pressure chamber 112 decreases, and the force of the valve spring 190 causes the valve ball 192 to seal against the valve inlet 114a, thereby inhibiting fluid flow out of the valve chamber 114 and ensuring the sleeve 106 remains pressurized. In the fourth, standby state, the sleeve 106 remains clamped to the first shaft 12 due to the valve 104.

Figure 6:
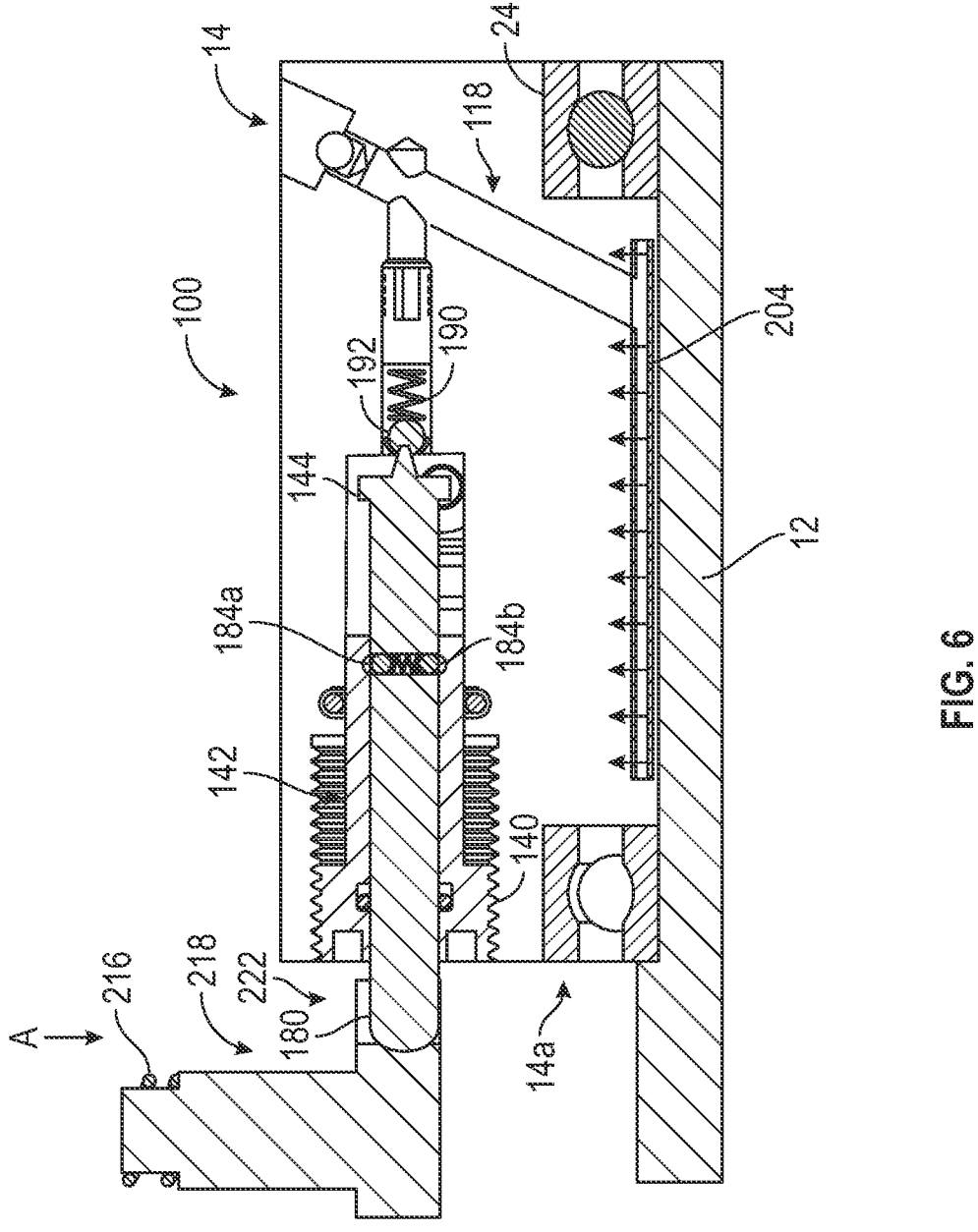
FIG. 6 is a cross-sectional view of the portion of the connection system, taken from the perspective of line 3-3 of FIG. 1, in which the connection system is in a second, disconnect state.

In order to move the connection system 100 to the second, disconnect state, with reference to FIG. 6, the controller 212 outputs the one or more control signals to the solenoid 210 based on the input received to the human-machine interface or sensor signals, for example. The solenoid 210 retracts the pin 214, and the force of the pawl spring 216 drives the ramp surface 224 into contact with the contact surface 180 of the valve actuation member 144. The contact between the pawl 218 and the second actuation end 172 of the valve actuation member 144 moves the valve actuation member 144 toward the valve chamber 114. The terminal end 170a of the valve actuation member 144 contacts the valve ball 192 and overcomes the force of the valve spring 190 to open the valve chamber 114. The detent balls 184a, 184b engage with the notches 168a, 168b, and inhibit the valve actuation member 144 from moving axially, which ensures the terminal end 170a remains in contact with valve ball 192 and the valve chamber 114 is open. With the valve chamber 114 open, the fluid drains or empties from the sleeve 106 into the first pressure chamber 112 and through the first fluid conduit 116 to the fluid reservoir 110. With the fluid drained from the sleeve 106, the sleeve 106 disengages or uncouples from the first shaft 12, thereby disconnecting the first shaft 12 from the second shaft 14.

Thus, the connection system 100 enables the first shaft 12 to be coupled and uncoupled from the second shaft 14 repeatedly, without damaging either of the first shaft 12 or the second shaft 14. Generally, once in the second, disconnect state, the connection system 100 may be placed back into the first, connect state, as discussed above. The ability to reset the connection system 100 to enable multiple coupling and uncoupling of the first shaft 12 and the second shaft 14 reduces downtime of the vehicle 10. In addition, the use of the sleeve 106 to engage the first shaft 12 extends a life of the connection system 100 as the sleeve 106 does not contact the first shaft 12 in the second, disconnect state, which reduces wear. The fluid contained within the connection system 100 also generally resides within the connection system 100 upon disconnection, and does not empty or require refilling for the next connection, which reduces contamination to surrounding systems during disconnection. Further, the use of the controller 212, which is responsive to input via the human-machine interface, allows the operator or pilot to control the movement of the connection system 100 to the second, disconnect state. In addition, the controller 212 also enables the control system 108 to automatically control the movement of the connection system 100 to the second, disconnect state based on sensor signals, for example.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A connection system for components, comprising:
a first component having a first rotatable shaft;

a second component having a second rotatable shaft;
a sleeve coupled to the second rotatable shaft, the sleeve including a hydraulic chamber configured to be disposed about a portion of the first rotatable shaft;
a valve fluidly coupled to the hydraulic chamber, the valve configured to control a flow of a hydraulic fluid relative to the hydraulic chamber;
a piston defining an inner piston bore that extends from a first piston end to a second piston end, the piston coupled to the second rotatable shaft and movable relative to the second rotatable shaft; and
a valve actuation member received within the inner piston bore and movable relative to the piston, the piston configured to move relative to the second rotatable shaft to couple the sleeve to the first rotatable shaft in a first state and the valve actuation member is configured to move relative to the piston to uncouple the sleeve from the first rotatable shaft in a second state.

2. The connection system of claim 1, further comprising a solenoid and a pawl coupled to the valve actuation member in the first state of the connection system, and in the second state of the connection system, the solenoid is configured to release the pawl to move the valve actuation member to open the valve to uncouple the sleeve from the first rotatable shaft.

3. The connection system of claim 1, wherein the piston includes a pair of notches, and the valve actuation member includes a detent system configured to couple the valve actuation member to the pair of notches in the second state.

4. The connection system of claim 1, further comprising a fluid reservoir defined in the second rotatable shaft that includes the hydraulic fluid, and the fluid reservoir is fluidly coupled to the valve and to the sleeve.

5. The connection system of claim 4, wherein the second rotatable shaft includes a first pressure chamber defined in the second rotatable shaft, the first pressure chamber fluidly coupled to the valve and to the fluid reservoir.

6. The connection system of claim 5, wherein the piston is coupled to the first pressure chamber, and the first pressure chamber includes a plurality of threads configured to engage with a plurality of piston threads of the piston.

7. The connection system of claim 5, wherein the valve is a check valve disposed in a valve chamber defined in the second rotatable shaft and fluidly coupled between the first pressure chamber and the sleeve.

8. The connection system of claim 7, wherein the sleeve is configured to receive the hydraulic fluid in the hydraulic chamber and to elastically deform to couple the first rotatable shaft to the second rotatable shaft in the first state.

9. The connection system of claim 8, wherein the valve chamber is fluidly coupled to the sleeve via a fluid conduit defined in the second rotatable shaft.

10. The connection system of claim 1, wherein the valve actuation member includes a first actuation end opposite a second actuation end, and a terminal end of the first actuation end is configured to engage the valve to open the valve.

11. The connection system of claim 10, wherein the second actuation end defines a contact surface.

12. A connection system for components, comprising:
a first component having a first rotatable shaft;
a second component having a second rotatable shaft, the second rotatable shaft defining a first pressure chamber and a valve chamber configured to receive a hydraulic fluid;
a sleeve coupled to the second rotatable shaft, the sleeve including an outer perimeter wall, an inner perimeter wall and defining a hydraulic chamber between the outer perimeter wall and the inner perimeter wall, the sleeve configured to be disposed about a portion of the first rotatable shaft and the hydraulic chamber fluidly coupled to the valve chamber;

a valve fluidly coupled to the valve chamber, the valve configured to control a flow of the hydraulic fluid relative to the hydraulic chamber;

a piston defining an inner piston bore that extends from a first piston end to a second piston end, the piston coupled to the first pressure chamber and movable relative to the first pressure chamber; and a valve actuation member received within the inner piston bore and movable relative to the piston, the piston configured to move relative to the first pressure chamber to open the valve and to fill the hydraulic chamber to couple the sleeve to the first rotatable shaft in a first state and the valve actuation member is configured to move relative to the piston to drain the hydraulic chamber to uncouple the sleeve from the first rotatable shaft in a second state.

13. The connection system of claim 12, further comprising a solenoid and a pawl coupled to the valve actuation member in the first state of the connection system, and in the second state of the connection system, the solenoid is configured to release the pawl to move the valve actuation member to actuate the valve to uncouple the sleeve from the first rotatable shaft.

14. The connection system of claim 12, wherein the piston includes a pair of notches, and the valve actuation member includes a detent system configured to couple the valve actuation member to the pair of notches in the second state.

15. The connection system of claim 12, further comprising a fluid reservoir defined in the second rotatable shaft that includes the hydraulic fluid, and the fluid reservoir is fluidly coupled to the valve and to the sleeve.

16. The connection system of claim 15, wherein the first pressure chamber is fluidly coupled between the valve and the fluid reservoir, and the first pressure chamber includes a plurality of threads configured to engage with a plurality of piston threads of the piston.

17. The connection system of claim 16, wherein the valve is a check valve, and the sleeve is configured to receive the hydraulic fluid in the hydraulic chamber and to elastically deform to couple the first rotatable shaft to the second rotatable shaft in the first state.

18. The connection system of claim 12, wherein the valve chamber is fluidly coupled to the sleeve via a fluid conduit defined in the second rotatable shaft.

19. The connection system of claim 12, wherein the valve actuation member includes a first actuation end opposite a second actuation end, and a terminal end of the first actuation end is configured to engage the valve to open the valve.

20. The connection system of claim 19, wherein the second actuation end defines a contact surface.

\* \* \* \* \*